(12) United States Patent
Massa et al.

(10) Patent No.: US 8,047,087 B2
(45) Date of Patent: Nov. 1, 2011

(54) LEVEL SENSOR MOUNTING

(75) Inventors: Greg Massa, Birmingham, MI (US); Jim Thompson, Novi, MI (US); Dean Armstrong, Keego Harbor, MI (US)

(73) Assignee: Inergy Automotive Systems Research (Societe Anonyme), Brussels (BE)

(*) Notice: Subject to any disclaimer, the term of this patent is extended or adjusted under 35 U.S.C. 154(b) by 325 days.

(21) Appl. No.: 11/721,851

(22) PCT Filed: Dec. 14, 2005

(86) PCT No.: PCT/EP2005/056764
§ 371 (c)(1),
(2), (4) Date: Oct. 12, 2007

(87) PCT Pub. No.: WO2006/064013
PCT Pub. Date: Jun. 22, 2006

(65) Prior Publication Data
US 2009/0249871 A1 Oct. 8, 2009

(51) Int. Cl.
*G01N 15/00* (2006.01)

(52) U.S. Cl. ....................................... 73/865.5

(58) Field of Classification Search .................. 73/304 C
See application file for complete search history.

(56) References Cited

U.S. PATENT DOCUMENTS

| | | | |
|---|---|---|---|
| 3,797,311 A * | 3/1974 | Blanchard et al. | 73/304 C |
| 3,864,974 A * | 2/1975 | Rauchwerger | 73/304 C |
| 4,200,405 A * | 4/1980 | Bauer | 403/142 |
| 4,399,699 A | 8/1983 | Fujishiro | |
| 4,679,431 A | 7/1987 | Jacob et al. | |
| 4,747,388 A | 5/1988 | Tuckey | |
| 5,309,764 A | 5/1994 | Waldrop et al. | |
| 6,335,690 B1 * | 1/2002 | Konchin et al. | 73/304 C |
| 2002/0043533 A1 * | 4/2002 | Gombert et al. | 156/66 |
| 2006/0027284 A1 | 2/2006 | Strasser | |

FOREIGN PATENT DOCUMENTS

| | | |
|---|---|---|
| DE | 38 14 357 | 11/1989 |
| FR | 2 560 167 | 8/1985 |
| FR | 2 873 321 | 1/2006 |
| FR | 2 875 430 | 3/2006 |
| FR | 2 877 256 | 5/2006 |
| JP | 63-79016 | 4/1988 |
| JP | 2-38892 B2 | 9/1990 |
| JP | 7-324962 | 12/1995 |
| JP | 2643828 B2 | 5/1997 |
| JP | 2004-117301 | 4/2004 |
| WO | WO 2004/091960 | 10/2004 |

OTHER PUBLICATIONS

Higgs, Fluid level sensing apparatus, Sep. 21, 1990, European Patent Publication.*
U.S. Appl. No. 12/293,313, filed Sep. 17, 2008, Mehta, et al.

* cited by examiner

*Primary Examiner* — Hezron E Williams
*Assistant Examiner* — Alex Devito
(74) *Attorney, Agent, or Firm* — Oblon, Spivak, McClelland, Maier & Neustadt, L.L.P.

(57) ABSTRACT

A method for fixing a fuel level sensor in a fuel tank having an upper and a lower wall, the sensor having a foot and a top. The method fixedly secures the foot of the sensor to the bottom wall of the fuel tank through a molded-in retainer, and elastically fixes the tubular top of the sensor to the top wall of the tank through a molded-in retainer as well.

14 Claims, 2 Drawing Sheets

LEVEL SENSOR MOUNTING

BACKGROUND OF THE INVENTION

I. Field of the Invention

The present invention relates to a level sensor mounting.

II. Description of Related Art

Typically automotive fuel systems use a rotary resistive fuel level sensor that is mounted directly to the fuel pump module to measure remaining fuel inside the tank.

The fuel tank is becoming more complex as many OEM's are packaging other components such as batteries, exhaust and driveline components around or through the fuel tank. A major advantage of a plastic fuel tank is it offers car manufacturers the ability to optimize and utilize available vehicle environment for fuel storage. However, because of this advancement many fuel systems are being designed with pump modules which are located below the full fuel level. This is known as a wet pump mounting. Wet mountings often inhibit the rotary fuel level sensor from sweeping to the full stop fuel level. Improving the measurement range requires a longer sensor float arm rod or an extension bracket to reposition or extend the sensor mounting off of the pump module. This can increase the difficulty of installing the pump module assembly inside the tank and can also decrease the accuracy of the measurement. Often it is not possible to reach the optimum sweep for the rotary fuel level sensor float arm even with an extension.

Other issues related to resistive rotary fuel level sensors are damage to the resistive circuit card due to aggressive fuels, limited resolution, and wear or damage of moving parts.

Because of these issues, car manufactures prefer to have a fuel level sensor with no moving parts.

Although many technologies have existed which have no moving parts, the cost has typically been two to five times higher than a resistive rotary gage. Introduction of non-moving part fuel level sensors for production applications has been limited to specialty vehicles due to high cost.

Another issue with some non-moving part fuel level sensors is that they are not bottom referenced (meaning they cannot measure to the bottom, empty level of the fuel tank) because they are usually only fixed to the top of the fuel tank, and not to the bottom.

For instance, U.S. Pat. No. 4,679,431 teaches the fixation of a capacitance fuel level sensor to the top of the tank only, using a specific, rather complicated system with a plurality of discs.

The problem of poor measuring accuracy owed to the lack of bottom referencing was already addressed in document FR 2,560,167, which solves the problem with a fixing method through which the gauge extends outside the tank which is nowadays avoided for permeability (environmental) reasons.

BRIEF SUMMARY OF THE INVENTION

The present invention aims at solving the problem of bottom referencing by providing a very simple method for fixing a fuel level sensor within a fuel tank, which does not lead to permeability issues.

To this end, the present invention relates to a method for fixing a fuel level sensor in a fuel tank having an upper and a lower wall, the sensor having a foot and a top, said method consisting in:
fixedly securing the foot of the sensor to the bottom wall of the fuel tank through a moulded-in retainer; and
elastically fixing the tubular top of the sensor to the top wall of the tank through a moulded-in retainer as well.

"Fuel tank" is intended to mean any type of tank capable of storing a liquid and/or gaseous fuel under varied pressure and temperature conditions. Reference is more particularly made to tanks of the type found in motor vehicles. The term "motor vehicle" is intended to include not only cars but also motorcycles and lorries (or trucks).

The tank may be made of metal or of plastic. The method according to the invention is well suited to a fuel tank made of plastic.

"Plastic" is intended to mean any material comprising at least one synthetic resin polymer.

All types of plastic may be suitable. Particularly suitable plastics belong to the category of thermoplastics.

"Thermoplastic" means any thermoplastic polymer, including thermoplastic elastomers and blends thereof. The term "polymer" denotes not only homopolymers but also copolymers (binary or ternary copolymers in particular). Examples of such copolymers are, with no restriction being implied, random copolymers, linear and other block copolymers and graft copolymers.

Any type of thermoplastic polymer or copolymer whose melting point is below the decomposition temperature is suitable. Synthetic thermoplastics that have a melting range spread over at least 10 degrees Celsius are particularly suitable. Examples of such materials are those that have a polydispersity of their molecular mass.

In particular, use may be made of polyolefins, polyvinyl halides, thermoplastic polyesters, polyketones, polyamides and copolymers thereof. A blend of polymers or copolymers may also be used, as may a mixture of polymeric materials with inorganic, organic and/or natural fillers such as, for example, but with no restriction being implied, carbon, salts and other inorganic derivatives, and natural or polymeric fibres. It is also possible to use multi-layer structures consisting of stacked, integral layers comprising at least one of the polymers or copolymers described above.

The preferred (but not limited to) sensor for this fuel level sensing application is a non-moving part sensor based on a continuous capacitance measurement. There are many types of capacitive fuel sensors. Preferred ones are those having a centre rod acting as the main electrode and an outer tube (referred to as tube or housing) acting as the reference electrode. The sensor measures the capacitance between the electrodes. As the fuel height increases the potential capacitance decreases and vice versa. Historically one issue with continuous capacitance has been the ability to discriminate between the various dielectric properties of commercial grades/types of fuel. In order to adjust and calibrate the sensor for various types of fuel, a reference sensor has been added to the bottom of the sensor to measure the dielectric constant of the fuel and recalibrate the sensor accordingly. This sensor offers high measurement resolution and has the ability to linearize the signal output with respect to fuel volume remaining in the tank.

The mounting and the retention of these sensors (and all other types of sensors implying a measurement from the bottom of the tank to the maximum fuel level, i.e. for which the ability to maintain bottom referencing is critical) are therefore an object of the present invention.

This retention takes place using retainers which according to the invention are moulded-in (i.e. moulded in one piece with the tank wall) cup shaped portions in relief. In order to insure the above mentioned bottom referencing, preferably at least the lower moulded-in retainer has its bottom in continuity with (in the same plane as) the tank wall. The upper retainer may have its bottom in continuity with the tank wall as well, or it may even extend upward, above the top surface of the tank to provide more retention and allow for more dynamic movement of the tank (or greater measurement range).

According to the invention, the sensor to be fixed (mounted) has a foot, i.e. a bottom part of a given shape, preferably well suited to be coupled to a reference sensor. The shape of this foot can also be well suited for being directly secured to the retainer moulded in the bottom wall of the fuel tank (i.e. a kind of snap fixed to or moulded together with the fuel tank, preferably in one piece with it). Alternatively, it is the reference sensor to which the foot is coupled (fixed) which can be secured to the retainer.

According to the invention, the sensor has a top, which may be of substantially tubular shape and which is elastically fixed to the top wall of the tank. This wall has a moulded-in retainer as well, which either comprises directly a part (preferably hollow) in which the top of the sensor can move, or has a shape suitable for receiving such part. By the terms "elastically fixed" and "move" is meant in fact that the top of the sensor can slide vertically in order to accommodate for the fuel tank deformation during ageing.

Especially in the case of a sensor based on a continuous capacitance measurement, said sensor may have the shape of a tube which extends from the inside bottom of the tank to the inside top of the tank. Such tube can have a linear shape or it can be formed in a serpentine shape. In that case, the reference sensor may be integrated in the lower end of said tube or serpentine instead of in a separate foot part, as described earlier. In that embodiment, the foot could also merely be the lower end of the tube or serpentine where the reference sensor is located. Alternatively, an additional part may be added as foot, insuring non-rotation of the sensor to prevent strain on the electrical wiring that go from the sensor to the electrical connector.

Preferably, there is an intermediate part between the top of the sensor and the moulded-in retainer, said part having a moving sphere shaped locator which mates with the moulded-in tank feature. This acts as a ball on the sensor side and as a socket on the tank side.

This part is retained to the tube by having snap features (legs) located at the base of the part which slide in slots cut into the tube to prevent disassembly. That part preferably comprises, besides the sphere, a cylindrical extension which helps to stabilize and guide it over the tube during assembly and normal tank expansion and contraction.

The top moulded-in retainer according to that embodiment is sphere shaped and has a lead-in for assembly ease. This feature acts as a socket. The bottom moulded-in feature acts as a pivot point and is designed to allow fuel to flow into the retaining feature (allows sensor to measure remaining fuel accurately).

According to a preferred embodiment, a small cylindrical pocket is located on the top of the sphere shaped attachment, said pocket being able to receive a small metal insert. This metal insert allows to insure the sensor has been assembled into the tank correctly, for instance by using a proximity sensor in the fuel tank assembly station which will detect the metal insert from the outside of the tank. A similar feature may be added to the attachment feature on the bottom of the tank.

The elastic fixation of the top of the sensor to the retainer moulded in the top of the tank (or a part secured to it) is preferably accomplished with a spring. The sensor usually has a housing and said spring can be wound around said housing. Alternatively, in the case of a system with a moving sphere as described above, the spring could be incorporated into the sphere.

The spring is preferably retained on the shaft of the tube (housing of the sensor) with a formed upset. This formed upset prevents the spring from sliding down the tube. It could be accomplished with tabs cut and bent directly into the tube.

Features could protrude into the tank or extend outward from the tank.

The retaining features (moulded-in retainers) are preferably in one piece with the tank wall. They are most preferably formed while moulding the tank itself, either with inserts in the mold or by encapsulating inserts. There could be separate features which are welded (or otherwise fixed) onto the inside tanks shell, preferably also during the manufacturing of the tank.

According to the invention, the sensor may be inserted in the tank (for installation/mounting) through the pump module opening. Alternatively, it could be fixed during the tank moulding itself, for instance by using a mould with a core (internal placement mechanism) or a robot in order to first mould the retainers and then, fix the sensor.

Such processes, which allow the formation of the retainers and eventually, the fixing of the sensor, preferably use parisons (or extruded performs) in two pieces, as described in co-pending applications FR 04.11550, FR 04.10081, FR 04.08196, the content of which in that regard being incorporated by reference in the present application.

In a particular embodiment, the fuel level sensor is used to mount a valve or another component inside of the fuel tank.

For instance, this component can be attached to the top of the sensor with an extension bracket. Typically the desired location for a fuel level limit valve (FLVV) and the top of the fuel level gauging curve are the same point (generally, the top of the volumetric centre of the tank), so that such a valve can advantageously be fixed together with the sensor according to the invention.

The method of the invention allows the fuel level sensor to be decoupled from the pump module allows the fuel level sensor to be mounted so that the sensor measures the optimum gauging curve provides a solution for reaching the full fuel level on systems with wet (submerged) module openings allows the sensor to be bottom referenced (allows the sensor to remain on bottom even if tank expands).

Furthermore, moulded-in features eliminate the need to add extra mounting brackets.

The invention can also provide mounting for other components inside the fuel tank (valves, sensors . . . ).

FIGS. 1 to 6 further illustrate the subject matter of the invention but are not to be construed as limiting its scope.

DETAILED DESCRIPTION OF THE INVENTION

Figure 1:
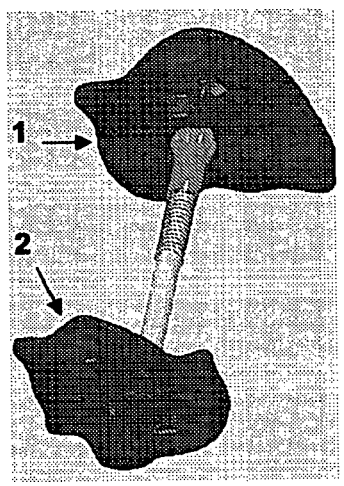
FIG. 1 is a perspective view of a sensor which is mounted according to an embodiment.

FIG. 1 shows the sensor mounted in the 2 retainers (1 and 2) moulded in one piece with the tank wall (not shown; the figure only shows the retainers cut out of said wall).

Figure 2:
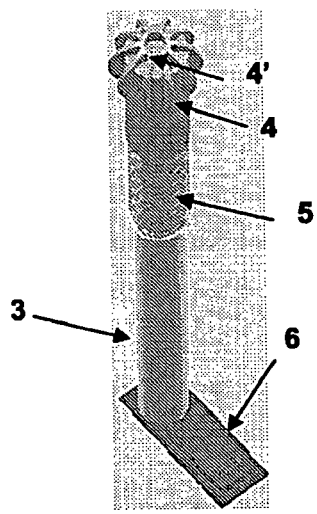
FIG. 2 is a perspective view of mounting elements of the sensor of FIG. 1.

FIG. 2 shows the details of the mounting elements of the sensor of FIG. 1. Said sensor includes a housing (3) and bears a spring (5). It is inserted into a connecting part (4) having a top shaped as a ball, said ball having on its top, a small cylindrical pocket (4') sized to be able to receive a metal insert (not shown), as explained earlier. The foot of the sensor is coupled to a reference sensor (6).

Figure 3:
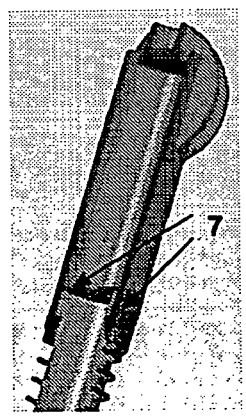
FIG. 3 is an auxiliary view of the fixing of a connecting part to the housing of the sensor of FIG. 1.

FIG. 3 shows the fixing of the connecting part (4) to the housing of the sensor (3), which takes place by means of legs (7) located at the base of the part and which slide in slots (8) cut into the housing (3).

Figure 4:
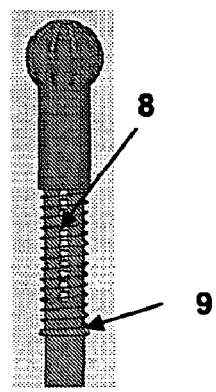
FIG. 4 is a side view of a connecting part of the sensor of FIG. 1 showing a slot.

FIG. 4 shows one such slot (8) as well as a formed upset (9) for providing the spring (5) from sliding.

Figure 5:
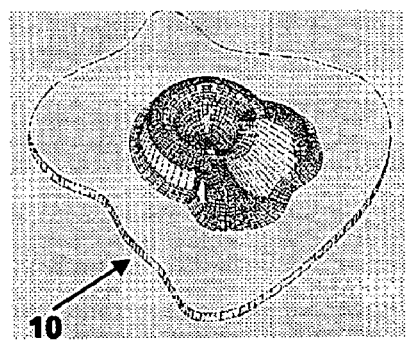
FIG. 5 is a perspective view of a top wall molded-in retainer according to an embodiment.
Figure 6:
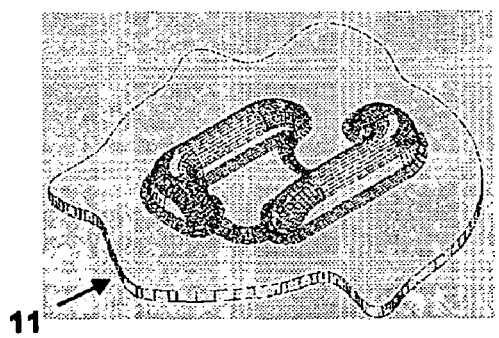
FIG. 6 is a perspective view of a bottom wall molded-in retainer according to an embodiment.

FIGS. 5 and 6 show pieces of the fuel tank respectively including the top wall (10) and the bottom wall (11) moulded-in retainers.

The invention claimed is:

1. A method for fixing a fuel level sensor in a fuel tank having a top wall and a bottom wall, the fuel level sensor having a foot and a top of substantially tubular shape, the method comprising:
   fixedly securing the foot of the fuel level sensor to the bottom wall of the fuel tank through a first retainer molded in the bottom wall; and
   elastically fixing the tubular top of the fuel level sensor to the top wall of the fuel tank through a second retainer molded in the top wall by elastically compressing the fuel level sensor between the first retainer and the second retainer.

2. The method according to claim 1, wherein the fuel tank is made of plastic.

3. The method according to claim 1, wherein the fuel level sensor is a non-moving part sensor based on a continuous capacitance measurement.

4. The method according to claim 1, wherein the foot of the fuel level sensor is either coupled to or integrates a reference sensor.

5. The method according to claim 1, wherein there is an intermediate part between the tubular top of the fuel level sensor and the second retainer, the intermediate part including a moving sphere shaped locator that mates with the second retainer.

6. The method according to claim 5, wherein the sphere shaped locator is retained to the tubular top of the fuel level sensor by legs located at a base of the intermediate part, the legs slide in slots cut into the tubular top.

7. The method according to claim 5, wherein a small cylindrical pocket is located on the top of the sphere shaped locator, the small cylindrical pocket configured to receive a small metal insert to ensure the fuel level sensor has been assembled into the fuel tank correctly.

8. The method according to claim 1, wherein the elastically fixing of the tubular top of the fuel level sensor to the second retainer is accomplished with a spring.

9. The method according to claim 8, wherein the fuel level sensor includes a housing and the spring is wound around the housing.

10. The method according to claim 9, wherein the spring is retained on the housing by a formed upset.

11. The method according to claim 1, wherein the fuel level sensor is used to mount a valve or another component inside of the fuel tank.

12. The method according to claim 1, wherein the elastically fixing comprises elastically fixing a telescoping coupling portion to the second retainer, the telescoping coupling portion being elastically sleeved with the tubular top of the fuel level sensor.

13. The method according to claim 1, wherein the first retainer and the second retainer are relieved into a surface of the bottom wall and a surface of the top wall, respectively.

14. The method according to claim 1, wherein the first retainer and the second retainer are cup-shaped.

* * * * *

UNITED STATES PATENT AND TRADEMARK OFFICE
CERTIFICATE OF CORRECTION

PATENT NO. : 8,047,087 B2  Page 1 of 1
APPLICATION NO. : 11/721851
DATED : November 1, 2011
INVENTOR(S) : Greg Massa et al.

It is certified that error appears in the above-identified patent and that said Letters Patent is hereby corrected as shown below:

On the title page, Item (75), the second inventor's name is incorrect. Item (75) should read:

-- (75) Inventors:  Greg Massa, Birmingham, MI (US); James Edward Thompson, Novi, MI (US); Dean Armstrong, Keego Harbor, MI (US) --

Signed and Sealed this

Thirty-first Day of January, 2012

David J. Kappos
*Director of the United States Patent and Trademark Office*